US012240086B1

(12) United States Patent
Rocklitz

(10) Patent No.: US 12,240,086 B1
(45) Date of Patent: Mar. 4, 2025

(54) INSTALLATION TOOL AND INSTALLATION METHOD FOR TENSIONED-FABRIC FRAMING SYSTEM

(71) Applicant: Eric Rocklitz, Minneapolis, MN (US)

(72) Inventor: Eric Rocklitz, Minneapolis, MN (US)

( * ) Notice: Subject to any disclaimer, the term of this patent is extended or adjusted under 35 U.S.C. 154(b) by 0 days.

(21) Appl. No.: 18/650,001

(22) Filed: Apr. 29, 2024

Related U.S. Application Data

(60) Provisional application No. 63/498,483, filed on Apr. 26, 2023.

(51) Int. Cl.
*B25B 27/00* (2006.01)

(52) U.S. Cl.
CPC ................................ *B25B 27/0092* (2013.01)

(58) Field of Classification Search
CPC .................................................. B25B 27/0092
See application file for complete search history.

(56) References Cited

U.S. PATENT DOCUMENTS 11,679,704 B1 * 6/2023 Gillan ...................... B60N 2/72
297/452.38

OTHER PUBLICATIONS

Sweet Rock Designs snagit wayback machine (Year: 2024).*

* cited by examiner

*Primary Examiner* — Jason L Vaughan
*Assistant Examiner* — Amanda Kreiling
(74) *Attorney, Agent, or Firm* — Brennan IP Law, LLC; Thomas F. Brennan

(57) ABSTRACT

A method and an installation tool used to install printed sheet media such as silicone edge graphics (SEG) fabric into a tensioned fabric framing system. An installation tool configured to receive SEG fabric receives a selected one of the silicone edges of the SEG fabric in a slotted tool and stretches the SEG fabric until one or more portions of the selected silicone edge line up with the slot of the tensioned fabric framing system. Portions of the selected silicone edge that line up with the slot of the tensioned fabric framing system are then pressed into the slot of the tensioned fabric framing system.

20 Claims, 2 Drawing Sheets

INSTALLATION TOOL AND INSTALLATION METHOD FOR TENSIONED-FABRIC FRAMING SYSTEM

RELATED APPLICATION

This application claims the benefit of priority to U.S. Provisional Patent Application No. 63/498,483, filed Apr. 26, 2023, which is incorporated herein by reference in its entirety.

FIELD OF THE INVENTION

The present invention relates to a framing system suitable for use with large format printed sheet media, and more particularly to tensioned fabric framing systems that use a frame made up of channels sized to hold the silicone edge of printed sheet media, such as Silicone Edge Graphics (SEG) fabric.

BACKGROUND

With the advent of large format printing, the use of large scale, custom printed tensioned fabric has become commonplace in environments such as trade show displays, event banners and signs, point of purchase displays and the like. In many instances, the tensioned fabric graphics are only temporarily displayed in a particular location, or the tensioned fabric display may be changed from location to location. Typically, the tensioned fabric is stretched and installed into the frame by pulling and hand stretching the fabric until the silicone edge can be aligned and slotted into the fabric's frame. Pulling, hand stretching and aligning are often difficult procedures—especially if the fabric is taut.

SUMMARY

An installation tool used to install SEG fabric panels is described herein. The tool aids in stretching and aligning SEG fabric panels to frames designed to hold them.

In one example approach, a tool is described for installing Silicone Edged Graphic (SEG) tensioned fabric into a frame. In one such example approach, the tool includes a handle and a head connected to the handle, wherein the head includes a slot disposed on the top of the tool, wherein the slot is sized to fit the dimensions of the silicone edge and fabric of the SEG, wherein the slot is angled to the main plane of the fabric panel.

In another example approach, a method for installing SEG fabric into a frame having a slot, the slot configured to receive a silicone edge of the SEG fabric, includes placing a selected one of the silicone edges of the SEG fabric in a slotted tool; stretching the SEG fabric until one or more portions of the selected silicone edge line up with the slot of the frame; and pressing one of the portions of the selected silicone edge that line up with the slot of the frame into the slot of the frame.

In yet another example approach, a method for installing SEG fabric into a frame having a slot, the slot configured to receive a silicone edge of the SEG fabric, includes placing a selected one of the silicone edges of the SEG fabric in a slotted tool; pulling the slotted tool with attached SEG fabric across the frame until one or more portions of the selected silicone edge line up with the slot of the frame; and pressing one of the portions of the selected silicone edge that line up with the slot of the frame into the slot of the frame to take up tension in the fabric.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following detailed description of example embodiments of the invention, reference is made to specific examples by way of drawings and illustrations. These examples are described in sufficient detail to enable those skilled in the art to practice the invention and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole and any reference to the invention, its elements, operation, and application do not limit the invention as a whole but serve only to define these example embodiments. The following detailed description does not, therefore, limit the scope of the invention.

SEG fabric panels typically have four sides, each side of the fabric panel having a silicone edge sewn to the fabric. The silicone edge is typically a rectangular strip roughly ½ inch tall and 0.12 inches thick-running most of each edge of the SEG panel. Including the SEG fabric and stitching, the edge is roughly 0.15 inches thick. As noted above, the tensioned fabric is stretched and installed into the frame by pulling and hand stretching the fabric until the silicone edge can be aligned and slotted into the fabric's frame. Pulling, hand stretching and aligning are often difficult procedures-especially if the fabric is taut.

Figure 1:
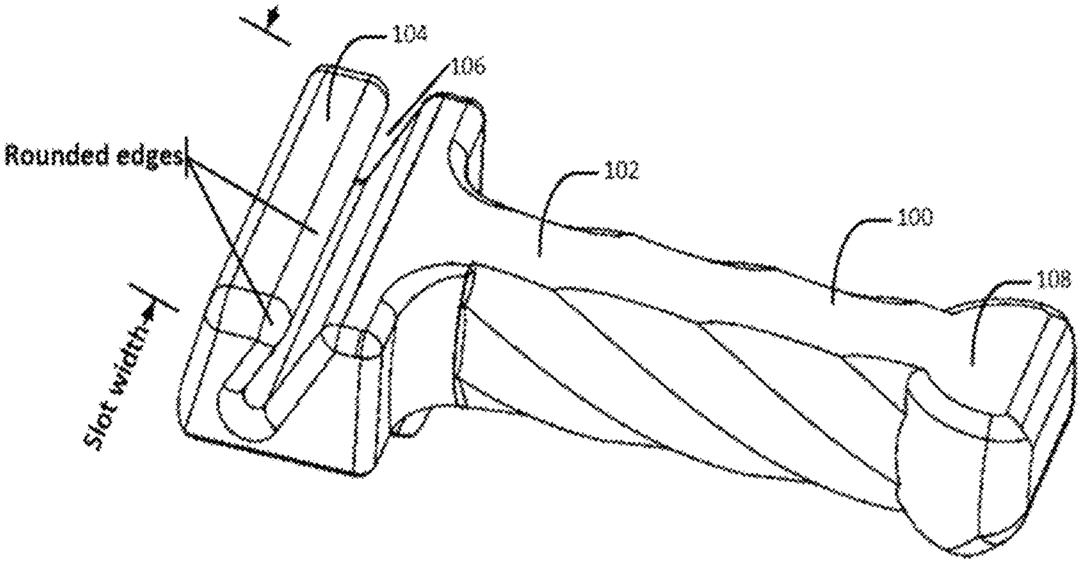
FIG. 1 is a perspective view of the top of one example approach to an installation tool in accordance with the present invention.

FIG. 1 is a perspective view of the top of one design of an installation tool in accordance with the present invention. In the example approach illustrated in FIG. 1, the tool 100 includes a handle 102 and a head 104 connected to the handle 102. The head 104 includes a slot 106 disposed on the top 108 of the tool, wherein the slot 106 is sized to fit the dimensions of the silicone edge and fabric of the SEG fabric, wherein the slot 106 is angled to the main plane of the SEG fabric panel.

Figure 2:
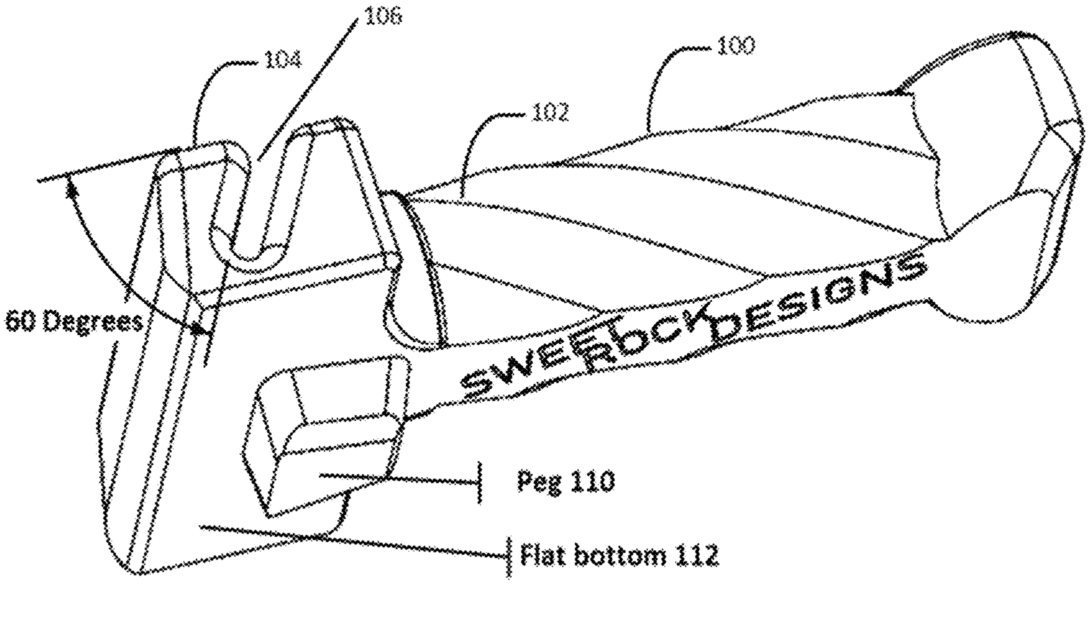
FIG. 2 is a perspective view of the bottom of one of one example approach to an installation tool in accordance with the present invention.

FIG. 2 is a perspective view of the bottom of one design of an installation tool in accordance with the present invention. In the example approach illustrated in FIG. 2, the tool 100 includes a handle 102 and a head 104 connected to the handle 102. The head 104 includes a slot 106 disposed on the top 108 of the tool, wherein the slot 106 is sized to fit the dimensions of the silicone edge and fabric of the SEG fabric, wherein the slot 106 is angled to the main plane of the SEG fabric panel. In one example approach, the angle is approximately 60 degrees. The head 104 further includes a mechanism for gaining leverage from the SEG frame when attempting to stretch the SEG fabric. In one example approach, as shown in FIG. 2, a peg 110 is disposed on the bottom 112 of the tool, wherein the mechanism is a peg 110 is configured to engage the frame to aid in stretching the SEG fabric during installation. In other example approaches, leverage is gained in one or more of the ways discussed below.

Figure 3:
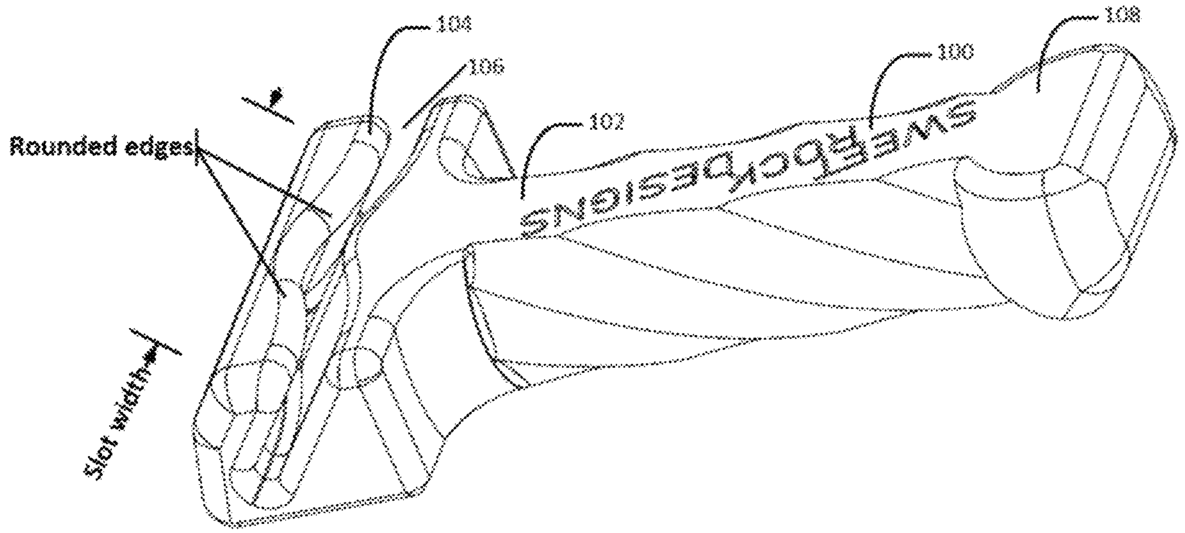
FIG. 3 is a perspective view of the top of another example approach to an installation tool in accordance with the present invention.

FIG. 3 is a perspective view of the top of another example approach to an installation tool in accordance with the present invention. In the example approach illustrated in FIG. 3, the tool 100 includes a handle 102 and a head 104 connected to the handle 102. The head 104 includes a slot 106 disposed on the top 108 of the tool, wherein the slot 106 is sized to fit the dimensions of the silicone edge and fabric of the SEG fabric, wherein the slot 106 is angled to the main plane of the SEG fabric panel. In the example approach of FIG. 3, the slot 104 is wavy as illustrated to provide better fabric grip. In one example approach the slot 104 is angled at 45 degrees instead of the approximately 60 degrees of the approach of FIGS. 1 and 2.

Figure 4:
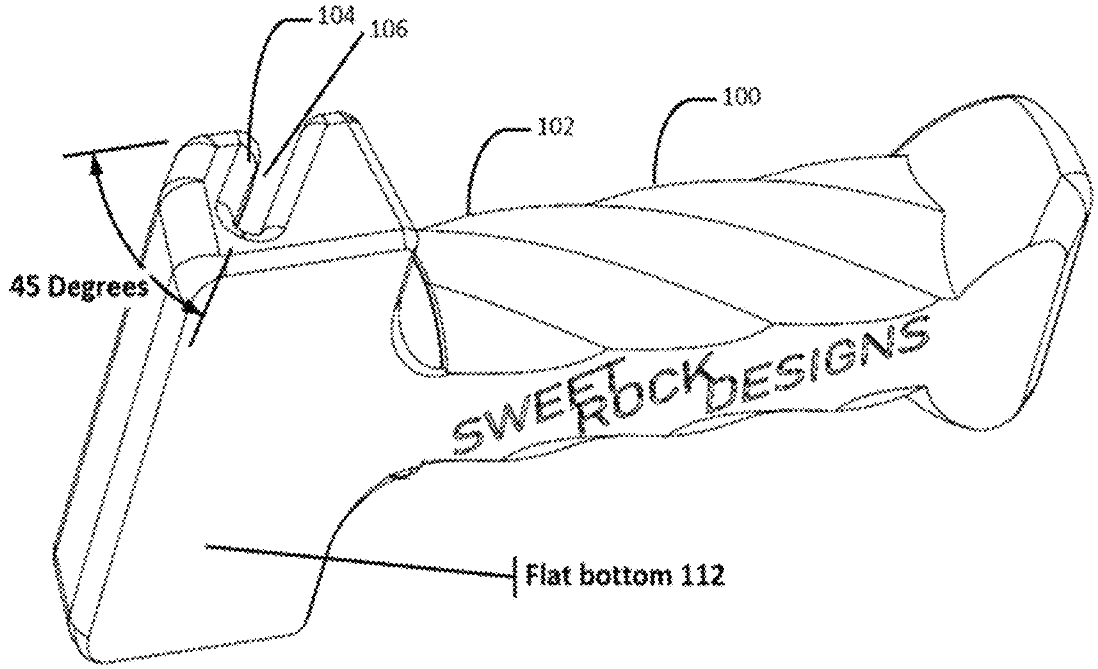
FIG. 4 is a perspective view of the bottom of another example approach to an installation tool in accordance with the present invention.

FIG. 4 is a perspective view of the bottom of another example approach to an installation tool in accordance with the present invention. In the example approach illustrated in FIG. 4, the tool 100 includes a handle 102 and a head 104 connected to the handle 102. The head 104 includes a slot 106 disposed on the top 108 of the tool, wherein the slot 106 is sized to fit the dimensions of the silicone edge and fabric of the SEG fabric, wherein the slot 106 is angled to the main plane of the SEG fabric panel. The head 104 further includes a mechanism for gaining leverage from the SEG frame when attempting to stretch the SEG fabric. In other example approaches, leverage is gained in one or more of the ways discussed below.

There are several aspects of the tool described herein that may be employed alone or in combination with other aspects, and the description of these aspects below in any particular combination is not intended to preclude their use in other combinations.

In a first aspect, the tool has a slot sized to fit the dimensions of the silicone edge of the SEG (FIG. 1). In one example approach, the SEG edge is configured to fit comfortably into the slot. Too narrow and installation becomes difficult. Too wide, and the SEG edge can too easily pull out of the slot. In one example approach, the slot is at least perpendicular to the plane of the main SEG panel. It is, however, desirable for the slot to be between 90 degrees and 45 degrees to the plane of the main SEG panel (as shown in FIG. 2). In the example shown in FIG. 2, the angle to the plane of the slot is approximately 60 degrees. In the example shown in FIG. 4, the angle to the plane of the slot is approximately 45 degrees.

In a second aspect, the edges of the slot in contact with the SEG fabric must be sufficiently rounded (FIG. 1) such that the fabric is not locally strained to the point that the fabric tears. Sharp edges on the tool are not desirable. In some example approaches, tool edges in contact with fabric are designed to have a radius of between 0.1 mm and 10 mm. In the example shown in FIGS. 1 and 2, the radius of the tool edge radius in contact with fabric is approximately 4 mm.

In a third aspect, the width of the slot 104 (FIGS. 1 and 3) is also important. Too short a slot width could result in local strains in the SEG fabric to the point that the fabric tears. A minimum slot width could be defined by the tool edge radius defined above, but other factors also come into play. The tool may be used to pull the fabric from side to side. Having a wider slot allows for a differential pull and stretch. A lower limit for slot width is set by fabric tear. An upper limit is set by case of differentially pulling the tool from side to side. In some approaches, the tool slot width is selected to be between 1 cm and 25 cm. A tool slot width of approximately 7 cm is shown in the tool shown in FIG. 1.

In a fourth aspect, the tool's side opposite the slot (bottom) (FIG. 2) is typically resting against a channel in the frame that contains the slot into which the SEG edge is installed. The tool can thus be levered against the frame. To aid in this levering, a peg 110 (FIG. 2) may be added to the bottom of the tool. Other features could be added to achieve a similar purpose. For instance, a raised wall perpendicular to the bottom, ridges, groves, or slots in the bottom, a friction aiding treatment to the surface like a rubber mat, or other method or combination of methods may be used to aid the tool in levering against the structure of the frame. In the example in FIG. 2, the method is a peg 110—since this also aids in allowing the tool to apply differential pull and stretch. In the example of FIG. 3, the curve in the edges of the slot 104 provides leverage.

In a fifth aspect, the tool has a handle. In some example approaches, the handle is selected to be long enough to apply leverage, and wide enough for comfort. It may be desirable for alignment for the handle to have a flat bottom.

These aspects, as well as others, will become apparent upon reference to the accompanying drawings and to the detailed description.

A method of installing an SEG fabric will be discussed next. The method includes using a tool such as described above in the context of FIGS. 1-4 to place the silicone edge of the SEG fabric into a slot in the tool and to pull the slotted tool with attached SEG fabric until the silicone edge mostly lines up with a slot in the frame. The tool has features to allow the installer to lever the tool against the frame and/or reposition a portion of the silicone edge relative to the slot in the frame. Once the silicone edge is mostly aligned with a portion of the frame near the tool, then push the silicone edge near the tool into the slot in the frame. Once the frame takes up a substantial amount of the tension in the fabric near the tool, move the tool to another section of the SEG panel, and repeat.

Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof, and any combination of the features described in the examples presented herein is explicitly contemplated as an additional example embodiment. This application is intended to cover any adaptations or variations of the example embodiments of the invention described herein.

What is claimed is:

1. A tool for installing Silicone Edged Graphic (SEG) tensioned fabric into an SEG frame having an SEG frame slot, the SEG tensioned fabric having a silicone edge, the SEG frame slot configured to receive the silicone edge of the SEG tensioned fabric being installed, the tool comprising:

a handle; and a head connected to the handle, wherein the head includes a tool slot disposed on the top of the tool, wherein the tool slot is sized to fit the dimensions of the silicone edge of the SEG tensioned fabric, wherein the slot is angled to receive the silicone edge of the SEG tensioned fabric and to secure the SEG tensioned fabric in the tool, and wherein the tool is configured to pull the SEG tensioned fabric secured by the tool across the SEG frame until one or more portions of the silicone edge line up with the SEG frame slot.

2. The tool of claim 1, wherein portions of the head that are in contact with the SEG tensioned fabric during installation are rounded to reduce strain on the SEG tensioned fabric.

3. The tool of claim 2, wherein edges and corners of the head in contact with the SEG tensioned fabric during installation are rounded with a radius of between approximately 0.1 mm to 10 mm.

4. The tool of claim 1, wherein, during installation, the slot is at an angle to the main plane of the SEG frame of between approximately 45 to 90 degrees.

5. The tool of claim 1, wherein the slot width is between approximately 1 cm and 25 cm.

6. The tool of claim 1, wherein portions of the tool in contact with the SEG frame during installation are flat.

7. The tool of claim 1, wherein the tool includes means for levering against the SEG frame during installation.

8. The tool of claim 7, wherein the means include a peg.

9. The tool of claim 7, wherein the means include a raised wall at an angle to a surface of the tool.

10. The tool of claim 7, wherein the means include one or more ridges, grooves, or slots on a surface of the tool.

11. The tool of claim 7, wherein the means include a friction treatment placed on a surface of the tool.

12. The tool of claim 1, wherein the handle includes a flat bottom section and wherein the slot is at an angle to a plane through the flat bottom section, the angle between approximately 45 degrees and approximately 90 degrees.

13. The tool of claim 1, wherein the head includes a flat bottom section and wherein the slot is at an angle to a plane through the flat bottom section, the angle between approximately 45 degrees and approximately 90 degrees.

14. The tool of claim 1, wherein the head includes a peg extending from a bottom portion of the head, the peg providing leverage against the SEG frame during installation.

15. The tool of claim 1, wherein the head includes a peg extending from a bottom portion of the head, wherein the peg, during installation, contacts a surface of the SEG frame.

16. The tool of claim 1, wherein the silicone edge has dimensions and wherein the slot is sized to fit the dimensions of the silicone edge.

17. A method for installing SEG fabric into a frame having a slot, the slot configured to receive a silicone edge of the SEG fabric, the method comprising:

placing a selected one of the silicone edges of the SEG fabric in a slotted tool;

stretching the SEG fabric until one or more portions of the selected silicone edge line up with the slot of the frame; and pressing one of the portions of the selected silicone edge that line up with the slot of the frame into the slot of the frame.

18. The method for installing SEG fabric of claim 17, wherein the method further includes:

moving the slotted tool to a new portion of the selected silicone edge;

stretching the SEG fabric until the new portion of the selected silicone edge lines up with the slot of the frame; and pressing the new portion of the selected silicone edge into the slot of the frame.

19. A method for installing SEG fabric into a frame having a slot, the slot configured to receive a silicone edge of the SEG fabric, the method comprising:

placing a selected one of the silicone edges of the SEG fabric in a slotted tool;

pulling the slotted tool with attached SEG fabric across the frame until one or more portions of the selected silicone edge line up with the slot of the frame; and pressing one of the portions of the selected silicone edge that line up with the slot of the frame into the slot of the frame to take up tension in the fabric.

20. The method for installing SEG fabric of claim 19, wherein the method further includes:

moving the slotted tool to a new portion of the selected silicone edge;

pulling the slotted tool with attached SEG fabric across the frame until the new portion of the selected silicone edge lines up with the slot of the frame; and pressing the new portion of the selected silicone edge into the slot of the frame.

* * * * *